United States Patent
Yasuda et al.

(10) Patent No.: US 9,708,986 B2
(45) Date of Patent: Jul. 18, 2017

(54) METHOD AND APPARATUS FOR CONTROLLING START-UP OF INTERNAL COMBUSTION ENGINE

(75) Inventors: Hajime Yasuda, Fuchu (JP); Kenichi Satou, Yokohama (JP); Hideaki Takahashi, Yokohama (JP); Hirotada Muraki, Kawasaki (JP); Hiroyuki Itoyama, Yokohama (JP); Tohru Shibata, Isehara (JP); Susumu Shimasaki, Ebina (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 426 days.

(21) Appl. No.: 13/820,922

(22) PCT Filed: Dec. 27, 2011

(86) PCT No.: PCT/JP2011/080215
§ 371 (c)(1),
(2), (4) Date: Mar. 5, 2013

(87) PCT Pub. No.: WO2012/091014
PCT Pub. Date: Jul. 5, 2012

(65) Prior Publication Data
US 2013/0173145 A1    Jul. 4, 2013

(30) Foreign Application Priority Data
Dec. 27, 2010 (JP) ................. 2010-290138

(51) Int. Cl.
*F02D 41/06* (2006.01)
*F02D 41/00* (2006.01)
*F02N 19/00* (2010.01)

(52) U.S. Cl.
CPC ....... *F02D 41/0002* (2013.01); *F02D 41/009* (2013.01); *F02D 41/062* (2013.01);
(Continued)

(58) Field of Classification Search
CPC ........... F02D 2200/101; F02D 41/0002; F02D 41/062; F02D 41/009; F02N 19/00; Y02T 10/42; F02P 5/1506
(Continued)

(56) References Cited

U.S. PATENT DOCUMENTS 4,307,450 A * 12/1981 Carp ................... F02D 41/266
                                                      123/696
4,955,346 A *  9/1990 Kaneyasu ........... F02D 11/105
                                                      123/361

(Continued)

FOREIGN PATENT DOCUMENTS

CN    1573061 A    2/2005
JP    63-124834 A   5/1988
(Continued)

OTHER PUBLICATIONS

Cook, J., "Application of a Crankshaft Position Sensor to Control Engine Timing," SAE Technical Paper 780213, 1978, doi:10.4271/780213.*

(Continued)

*Primary Examiner* — Jacob Amick
(74) *Attorney, Agent, or Firm* — Foley & Lardner LLP

(57) ABSTRACT

The internal combustion engine (1) has a throttle (23) for controlling an intake air amount and performs start-up through cranking. The starter switch (36) detects cranking initiation, and the crank angle sensor (33, 34) detects the number of revolutions of the engine. The controller (31) drives the throttle (23) in a closed position along with the cranking initiation. The controller (31) can obtain both the intake negative pressure for promoting vaporization of fuel and the intake air amount necessary to maintain the idle rotation speed by counting the number of strokes or the number of revolutions of the internal combustion engine (1) from the cranking initiation and opening the throttle (23)

(Continued)

from the closed position as the count number reaches a predetermined number.

7 Claims, 11 Drawing Sheets

(52) U.S. Cl.
CPC ........ *F02N 19/00* (2013.01); *F02D 2200/101* (2013.01); *Y02T 10/42* (2013.01)

(58) Field of Classification Search
USPC .................. 123/179.3, 406.45; 701/103, 113
See application file for complete search history.

(56) References Cited

U.S. PATENT DOCUMENTS

| | | | |
|---|---|---|---|
| 5,163,408 A | 11/1992 | Nemoto | |
| 5,353,636 A * | 10/1994 | Sakurai | G01M 15/11 73/114.11 |
| 5,452,604 A | 9/1995 | Namiki et al. | |
| 5,950,419 A | 9/1999 | Nishimura et al. | |
| 6,510,834 B1 * | 1/2003 | Tomita | F02D 37/02 123/295 |
| 6,966,299 B2 * | 11/2005 | Miyamoto | F02D 37/02 123/339.11 |
| 7,040,296 B2 | 5/2006 | Lee | |
| 8,353,266 B2 * | 1/2013 | White | F02D 41/062 123/179.16 |
| 2004/0123831 A1 * | 7/2004 | Grieser | F02D 9/02 123/198 DB |
| 2004/0244779 A1 * | 12/2004 | Lee | F02D 41/0027 123/487 |
| 2005/0039723 A1 * | 2/2005 | Miura | F01L 13/0026 123/435 |
| 2008/0236265 A1 * | 10/2008 | Dian | F02D 41/009 73/114.26 |
| 2009/0138177 A1 * | 5/2009 | Sawut | F02D 31/002 701/103 |
| 2011/0224861 A1 * | 9/2011 | Nagakura | B60K 6/445 701/31.4 |
| 2013/0173145 A1 * | 7/2013 | Yasuda | F02D 41/0002 701/113 |

FOREIGN PATENT DOCUMENTS

| | | | |
|---|---|---|---|
| JP | 03-124968 A | | 5/1991 |
| JP | 4-159432 A | | 9/1992 |
| JP | 6-229311 A | | 8/1994 |
| JP | 08-232645 A | | 9/1996 |
| JP | 2000-104599 A | | 4/2000 |
| JP | 2000104599 A | * | 4/2000 |
| JP | 2000-154749 A | | 6/2000 |
| JP | 2000-220495 A | | 8/2000 |
| JP | 2004-092603 A | | 3/2004 |
| JP | 3586975 B2 | | 8/2004 |
| JP | 2005-264781 | | 9/2005 |
| JP | 2007-071083 A | | 3/2007 |
| JP | 2007-262898 A | | 10/2007 |
| JP | 2007-278073 A | | 10/2007 |
| JP | 2010-163931 A | | 7/2010 |

OTHER PUBLICATIONS

Japanese Office Action, Oct. 29, 2013, 2 pages.
Japanese Office Action, Jan. 28, 2014, 2 pages.
Japanese Office Action, Jun. 3, 2014, 3 pages.

* cited by examiner

31 ENGINE CONTROLLER
32 AIR FLOW METER
33 POSITION SENSOR
34 PHASE SENSOR
35 OXYGEN SENSOR
36 STARTER SWITCH
37 TEMPERATURE SENSOR
42 ACCELERATOR PEDAL DEPRESSION
   AMOUNT SENSOR

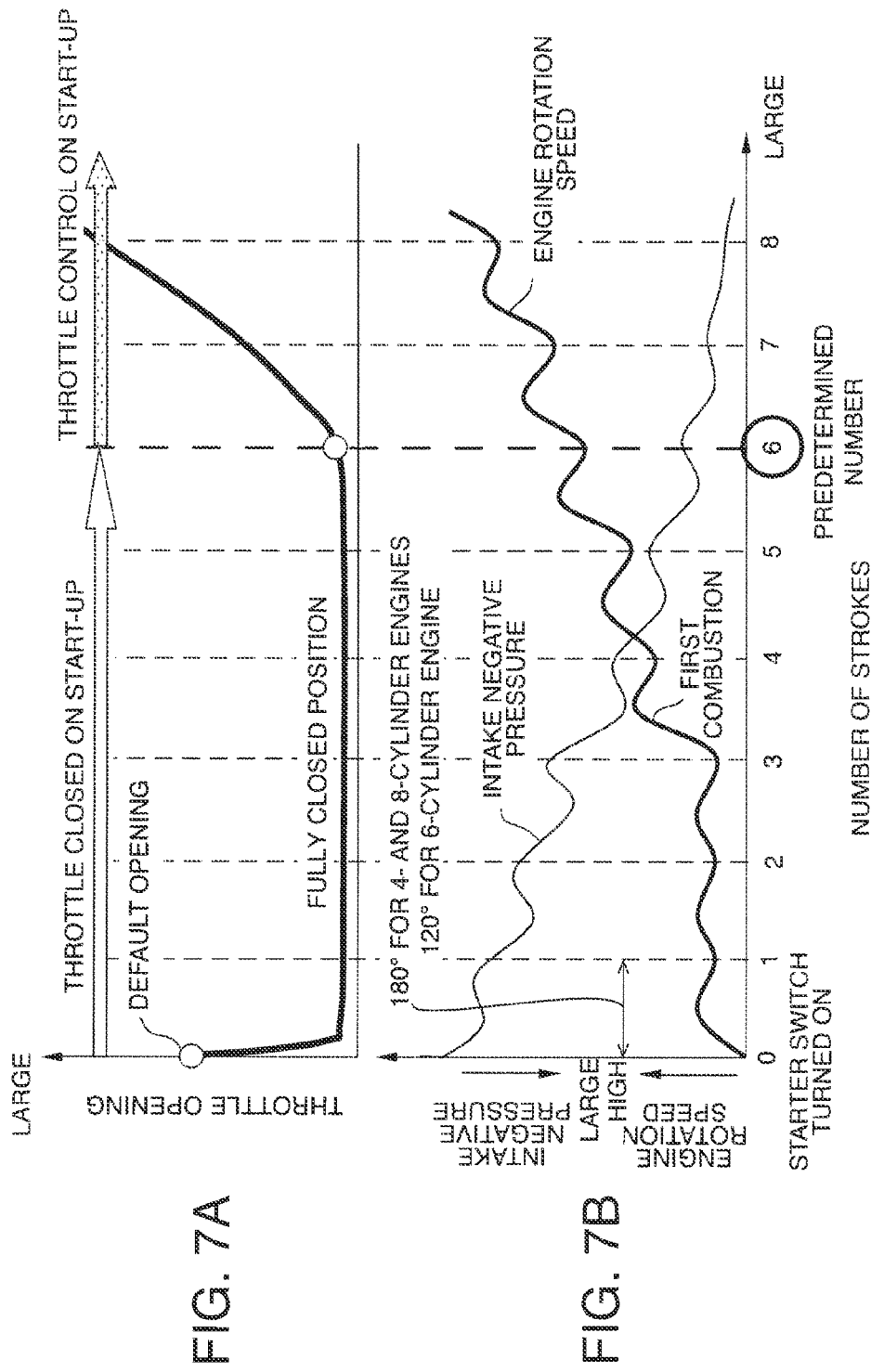

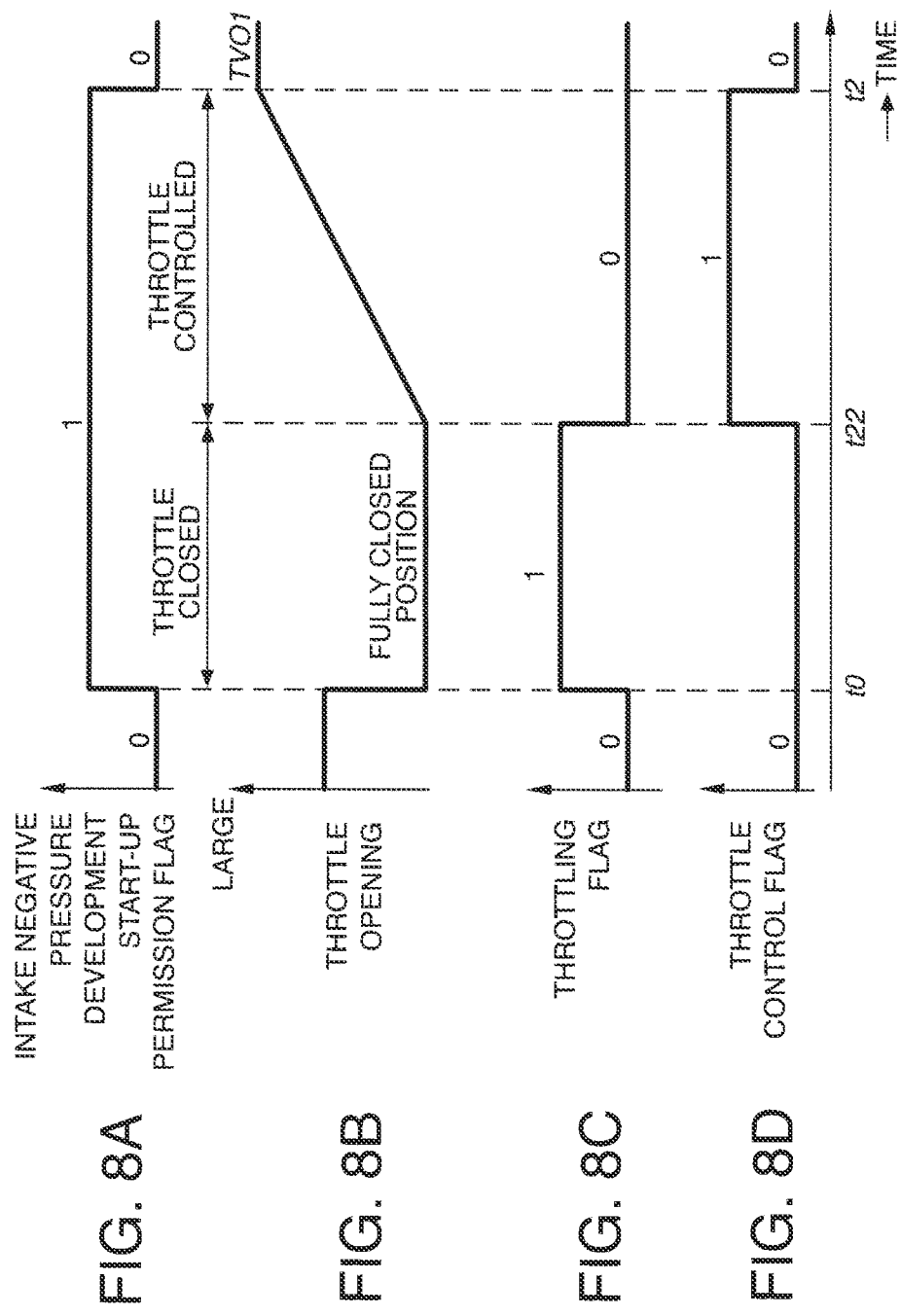

METHOD AND APPARATUS FOR CONTROLLING START-UP OF INTERNAL COMBUSTION ENGINE

FIELD OF THE INVENTION

This invention relates to start-up control of an internal combustion engine.

BACKGROUND ART

When a spark ignition type internal combustion engine starts through cranking, it is desirable that an engine rotation speed be controlled to early increase to a target idle rotation speed by suppressing an excessive increase in the engine rotation speed after complete combustion in order to suppress fuel consumption and obtain a desirable exhaust gas composition.

JP 2007-278073 A, published by Japan Patent Office in 2007, discloses engine control for this purpose. Specifically, this control includes control of an intake throttle opening of an internal combustion engine, control of a fuel injection amount, and control of an ignition timing of the injected fuel.

According to this prior art, increase of hydrocarbons (HC) in the exhaust gas is prevented by suppressing an excessive increase in the engine rotation speed generated after the engine rotation speed reaches the target idle rotation speed while controlling an air-fuel ratio to a stoichiometric air-fuel ratio.

SUMMARY OF THE INVENTION

When the internal combustion engine starts, in order to suppress discharge of hydrocarbons (HC) by promoting vaporization of fuel, it is desirable to early develop an intake negative pressure. For this purpose, according to the prior art, a throttle is closed when cranking of the internal combustion engine is initiated, and the throttle is then opened when the internal combustion engine performs complete combustion.

However, the rotation speed of the internal combustion engine is apt to pulsate during the start-up and shows a large amplitude fluctuation. If the throttle starts to be opened when the engine rotation speed reaches a predetermined complete combustion speed as in the case of the prior art, development of the intake negative pressure may be delayed due to a decrease in the rotation speed that may be caused thereafter. The delayed development of the intake negative pressure causes deterioration of the exhaust gas composition or increase of the fuel consumption.

Meanwhile, if the throttle opening initiation timing is delayed relatively to the above timing, it is difficult to supply the amount of air required to maintain the idle rotation speed. This may cause a start-up failure.

It is therefore an object of this invention to implement throttle control capable of promoting development of the intake negative pressure during the internal combustion engine start-up while supplying an adequate intake air amount to maintain the idle rotation speed.

In order to achieve the above object, this invention provides a method of controlling start-up of an internal combustion engine that has a throttle for controlling an intake air amount and performs a start-up through cranking. The method includes detecting cranking initiation of the internal combustion engine, closing the throttle when the cranking is initiated or when an ignition switch is turned on, counting a number of strokes or a number of revolutions from the cranking initiation of the internal combustion engine, determining whether or not a count number has reached a predetermined number, and opening the throttle when the count number has reached the predetermined number.

The details as well as other features and advantages of this invention are set forth in the remainder of the specification and are shown in the accompanying drawings.

BRIEF DESCRIPTION OF THE DRAWINGS

FIGS. 7A and 7B are timing charts for describing a concept of setting a throttle opening initiation timing based on a number of strokes according to this invention;

FIGS. 8A to 8D are timing charts illustrating a relationship between various flag settings and a throttle opening variation according to this invention;

DESCRIPTION OF THE PREFERRED EMBODIMENTS

Figure 1:
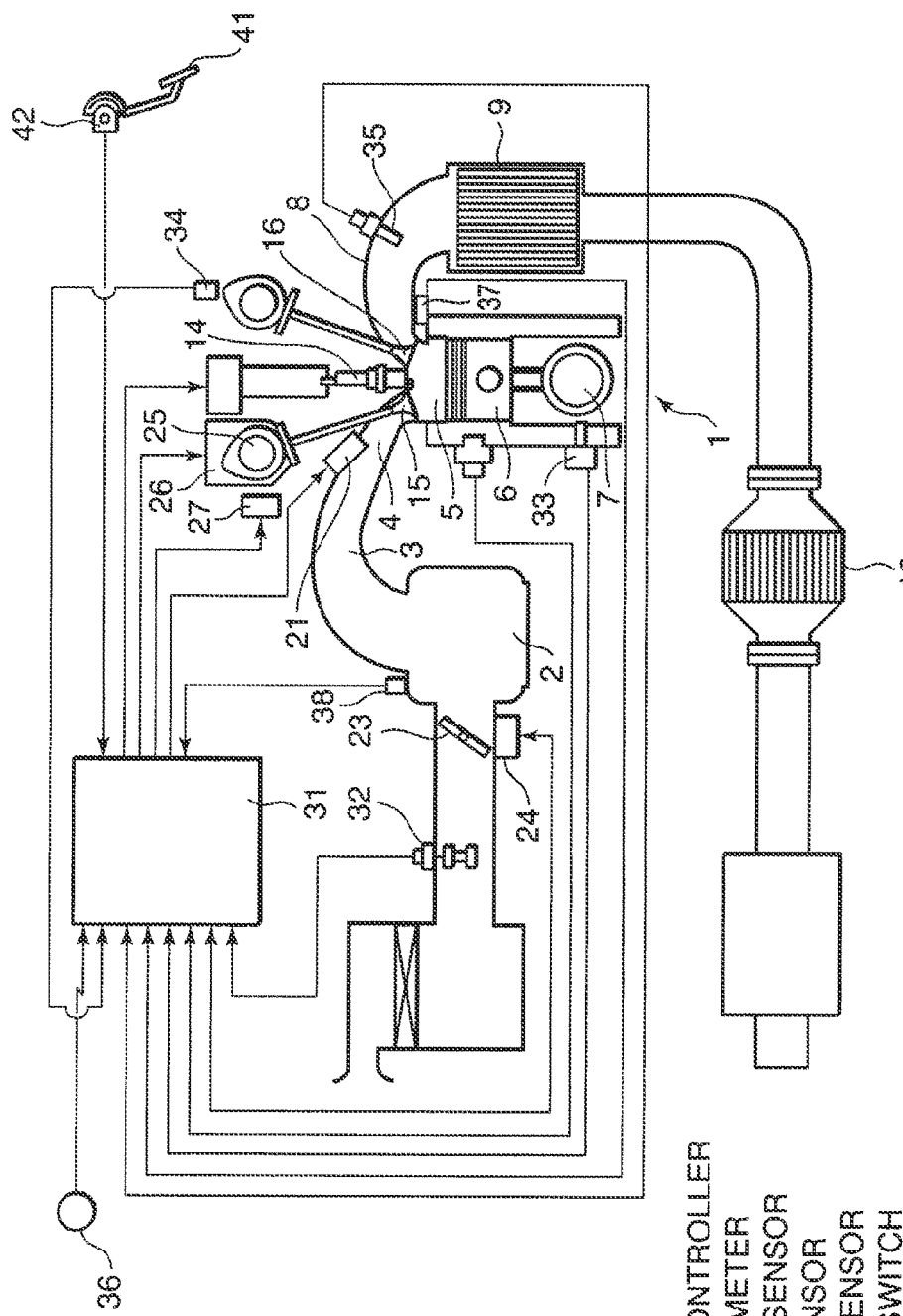
FIG. 1 is a schematic diagram of an apparatus for controlling an internal combustion engine according to this invention.

Referring to FIG. 1 of the drawings, in a vehicle internal combustion engine 1, an intake air is accumulated in an intake collector 2 after adjusting an amount thereof by a throttle 23. The accumulated air is then introduced into a combustion chamber 5 of each cylinder through an intake manifold 3 and an intake valve 15. The internal combustion engine 1 is a multi-cylinder spark ignition type reciprocating engine.

An intake port 4 of each cylinder is provided with a fuel injector 21. The fuel injector 21 intermittently injects fuel into the intake port 4 at predetermined timings. The fuel injected into the intake port 4 is mixed with the intake air to form a fuel mixture. The fuel mixture is confined in the combustion chamber 5 by closing the intake valve 15. The fuel mixture in the combustion chamber 5 of each cylinder is then compressed by a piston 6 provided in each cylinder, ignited by a spark plug 14, and burns.

The gas pressure caused by the combustion of the fuel mixture pushes down the piston 6 and generates a reciprocal motion of the piston 6. The reciprocal motion of the piston 6 is converted into a rotational motion of a crankshaft 7. The gas after combustion is discharged to an exhaust passage 8 as an exhaust gas through an exhaust valve 16.

The exhaust passage 8 is provided with an exhaust manifold connected to each cylinder. The exhaust manifold is provided with a first catalyst 9 as a start-up catalyst. The exhaust passage 8 extends to an underfloor of a vehicle. The exhaust passage 8 in the underfloor portion is provided with a second catalyst 10.

Both the first and second catalysts 9 and 10 are, for example, a three-way catalyst. The three-way catalysts can simultaneously and efficiently remove hydrocarbons (HC), carbon monoxide (CO), and nitrogen oxides (NOx) contained in the exhaust gas when the air-fuel ratio remains in a narrow range centered at a stoichiometric air-fuel ratio.

Operation of the internal combustion engine 1 is controlled by an engine controller 31. Specifically, the engine controller 31 controls an intake air amount of the throttle 23, a fuel injection amount of the fuel injector 21, and an ignition timing of the spark plug 14.

The engine controller 31 comprises a microcomputer having a central processing unit (CPU), a read-only memory (ROM), a random access memory (RAM), and an input/output interface (I/O interface). The engine controller 31 may comprise a plurality of microcomputers.

For the control purposes described above, the engine controller 31 receives input signals corresponding to detection values from an air flow meter 32 that detects the intake air amount, a crank angle sensor that detects a reference rotation position of the internal combustion engine 1 as well as a unit rotation angle thereof, an oxygen sensor 35 that detects an oxygen concentration in the exhaust gas and is provided in the upstream of the first catalyst 9 of the exhaust passage 8, an accelerator pedal depression amount sensor 42 that detects a depression amount of an accelerator pedal 41 of a vehicle, a starter switch 36 used by a vehicle driver to instruct cranking of the internal combustion engine 1, and a temperature sensor 37 that detects an engine coolant temperature. The crank angle sensor includes a position sensor 33 that detects a unit rotation angle of the internal combustion engine 1 and a phase sensor 34 that detects a reference rotation position of the internal combustion engine 1.

The engine controller 31 sets a basic fuel injection amount of the fuel injector 21 based on such input signals and performs feedback control for the air-fuel ratio in the combustion chamber 5 based on the input signal from the oxygen sensor 35 provided in the upstream of the first catalyst 9.

In a cold start-up of the internal combustion engine 1, it is desirable that the feedback control of the air-fuel ratio be implemented early by activating both the catalysts 9 and 10 and the oxygen sensor 35 early. For this purpose, the oxygen sensor 35 is heated by a heater immediately after the start-up. The engine controller 31 determines activation of the oxygen sensor 35 based on the input signal from the oxygen sensor 35. The engine controller 31 initiates the feedback control of the air-fuel ratio as soon as the oxygen sensor 35 is activated.

The catalysts 9 and 10 are not limited to the three-way catalyst. For example, in some vehicles, the internal combustion engine is driven at a lean air-fuel ratio by supplying a fuel mixture to the combustion chamber 5 at an air-fuel ratio leaner than the stoichiometric air-fuel ratio in a low-load driving range to improve fuel efficiency after completing the engine warm-up. In such a vehicle, it is necessary to absorb nitrogen oxides (NOx) generated in a large amount at a lean air-fuel ratio. In this regard, the second catalyst 10 may comprise a NOx trap catalyst having a function of the three-way catalyst. This invention may also be applicable to the vehicle that uses such a catalyst.

Control of the intake air amount using the throttle 23 is performed by controlling a throttle motor 24 that drives the throttle 23. A torque required by a driver is input as a depression amount of the accelerator pedal 41. The engine controller 31 defines a target torque based on the depression amount of the accelerator pedal 41. The engine controller 31 computes a target intake air amount for obtaining the target torque and outputs a signal corresponding to the target intake air amount to the throttle motor 24 to control the opening of the throttle 23.

The internal combustion engine 1 includes a variable valve lift mechanism 26 having an articulated link that continuously changes a valve lift amount of the intake valve 15 and a variable valve timing mechanism 27 that continuously and variably controls a rotational phase difference between the crank shaft 7 and the intake valve camshaft 25 to advance or delay the open/close timing of the intake valve 15.

The engine controller 31 performs control for start-up of the internal combustion engine 1 as explained below:

(1) Delay the ignition timing from a start-up ignition timing to a predetermined ignition timing, for example, a catalyst warm-up promoting ignition timing in a stepwise manner or at a sufficient change speed with which at least the engine rotation speed is prevented from an excessive increase when it reaches a target idle rotation speed after the cranking; and (2) Start to open the throttle 23 before a predetermined time period from the timing at which the engine rotation speed reaches the target idle rotation speed in order to supply the combustion chamber 5 with the intake air amount necessary to maintain the engine rotation speed in the target idle rotation speed when the engine rotation speed reaches the target idle rotation speed.

Through the aforementioned control, the warm-up of the first catalyst 9 is promoted. In addition, it is possible to prevent increase of hydrocarbons in the exhaust gas by suppressing the excessive increase in the engine rotation speed after the engine rotation speed reaches the target idle rotation speed while stabilizing the air-fuel ratio to the stoichiometric air-fuel ratio.

A control routine executed by the engine controller 31 for this purpose will now be described. First, with reference to FIGS. 2 to 5, description will be made for control of the ignition timing, the throttle opening, and the fuel injection amount in the start-up of the internal combustion engine 1 according to the prior art. Then, description will be made for control according to this invention.

Figure 2:
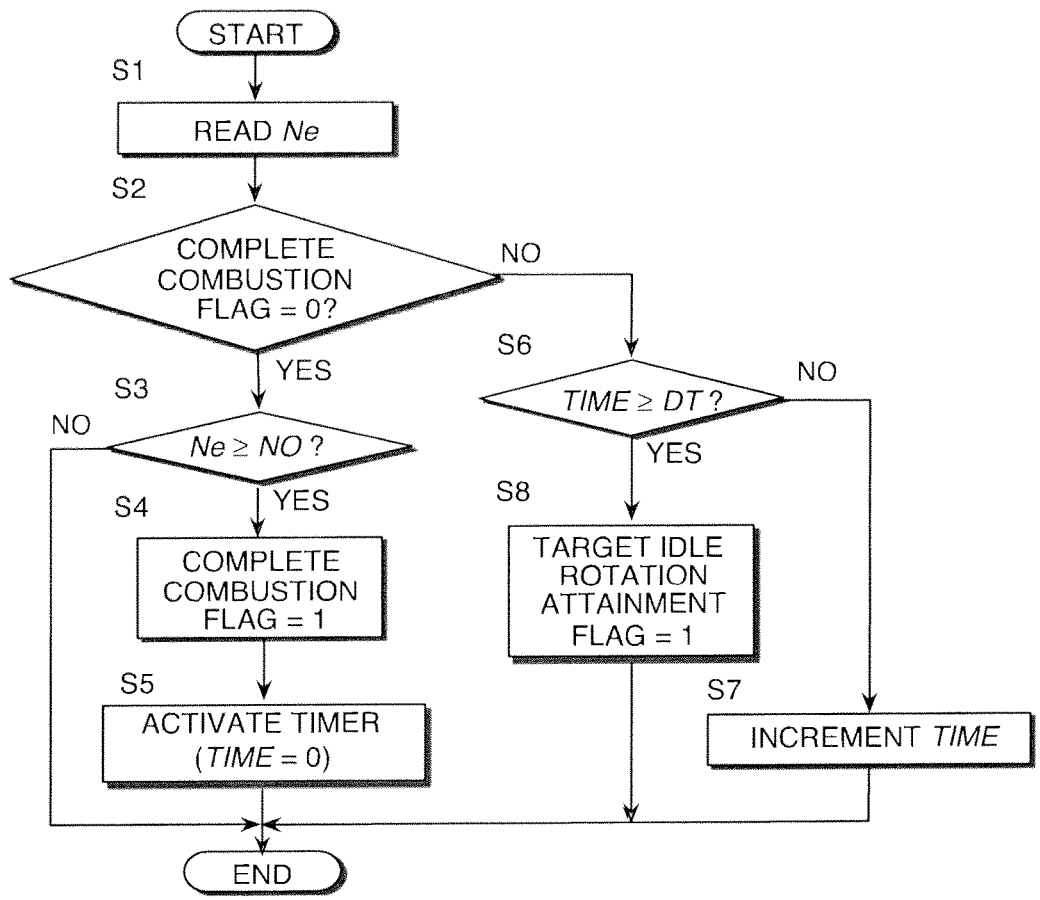
FIG. 2 is a flowchart illustrating a routine for setting a complete combustion flag and a target attainment flag executed by an engine controller according to a prior art.

FIG. 2 illustrates a routine for setting a complete combustion flag and a target idle rotation attainment flag. The engine controller 31 executes this routine at certain intervals, for example, every 100 milliseconds, while an ignition switch provided in the vehicle is turned on. In addition, the engine controller 31 is activated when the ignition switch is switched from OFF to ON, and the engine controller 31 remains in an operation state while the ignition switch is turned on.

In a step S1, the engine controller 31 reads the engine rotation speed Ne. The engine rotation speed Ne is computed based on the input signal from the crank angle sensor including the position sensor 33 and the phase sensor 34.

In a step S2, the engine controller 31 determines the complete combustion flag. The complete combustion flag is a flag indicating whether or not the internal combustion engine 1 has achieved a complete combustion. The complete combustion flag is initially set to zero when the ignition switch is switched from OFF to ON. For this reason, when the routine is executed for the first time, the complete combustion flag is reset to zero. When the complete combustion flag is zero, the engine controller 31 compares the engine rotation speed Ne and the complete combustion rotation speed N0 in a step S3. The complete combustion rotation speed N0 is provided to determine whether or not the internal combustion engine 1 is subjected to complete combustion. For example, the complete combustion rotation speed is set at 1,000 revolutions per minute (RPM). When the engine rotation speed Ne does not reach the complete combustion rotation speed N0, the engine controller 31 terminates the routine immediately.

Meanwhile, when the engine rotation speed Ne reaches the complete combustion rotation speed N0, that is, in the case of Ne≥N0, the engine controller 31 sets the complete combustion flag to unity in a step S4.

Then, in a step S5, the engine controller 31 activates a timer. The timer measures time elapsed from the timing at which the engine rotation speed Ne reaches the complete combustion rotation speed N0, and the timer value TIME is reset to zero when the timer is activated. After the processing of the step S5, the engine controller 31 terminates the routine.

In this way, if the complete combustion flag is set to unity in the step S4, determination of the step S2 is changed to be affirmative in the next routine execution, and as a result, the processing of steps S6 to S8 is performed.

In the step S6, the engine controller 31 compares the timer value TIME and a predetermined value DT. The predetermined value DT means a time interval from the timing at which the engine rotation speed Ne reaches the complete combustion rotation speed N0 to the timing at which the engine rotation speed Ne reaches the target idle rotation speed NSET. The predetermined value DT is set through experiment or simulation in advance.

Since the timer value TIME immediately after the timer is activated is smaller than the predetermined value DT, determination of the step S6 is negative. In this case, the engine controller 31 increases the timer value TIME by a predetermined increment in a step S7. The predetermined increment is set to a value corresponding to a routine execution interval.

In this way, the timer value TIME increases whenever the routine is executed. As a result, the timer value TIME becomes equal to or greater than the predetermined value DT, and determination of the step S6 is changed from negative to affirmative. In this case, the engine controller 31 sets the target idle rotation attainment flag, which indicates a fact that the rotation speed has reached the target idle rotation speed NSET, to unity in the step S8. It should be noted that the target idle rotation attainment flag is a flag initially set to zero when the ignition switch is switched from OFF to ON. After the processing of the step S7 or the step S8, the engine controller 31 terminates the routine.

As described above, the engine controller 31 determines whether or not the internal combustion engine 1 performs the complete combustion, and the engine rotation speed reaches the target idle rotation speed by repeatedly executing a routine for setting the complete combustion flag and the target idle rotation attainment flag at certain cycles immediately after the ignition switch is switched from OFF to ON. Then, the engine controller 31 sets corresponding flags. In the step S6, it is determined that the engine rotation speed reaches the target idle rotation speed NSET when time corresponding to the predetermined value DT elapses after the internal combustion engine 1 performs complete combustion. However, this determination may be made by directly comparing the target idle rotation speed NSET and the engine rotation speed Ne detected by the crank angle sensor.

Figure 3:
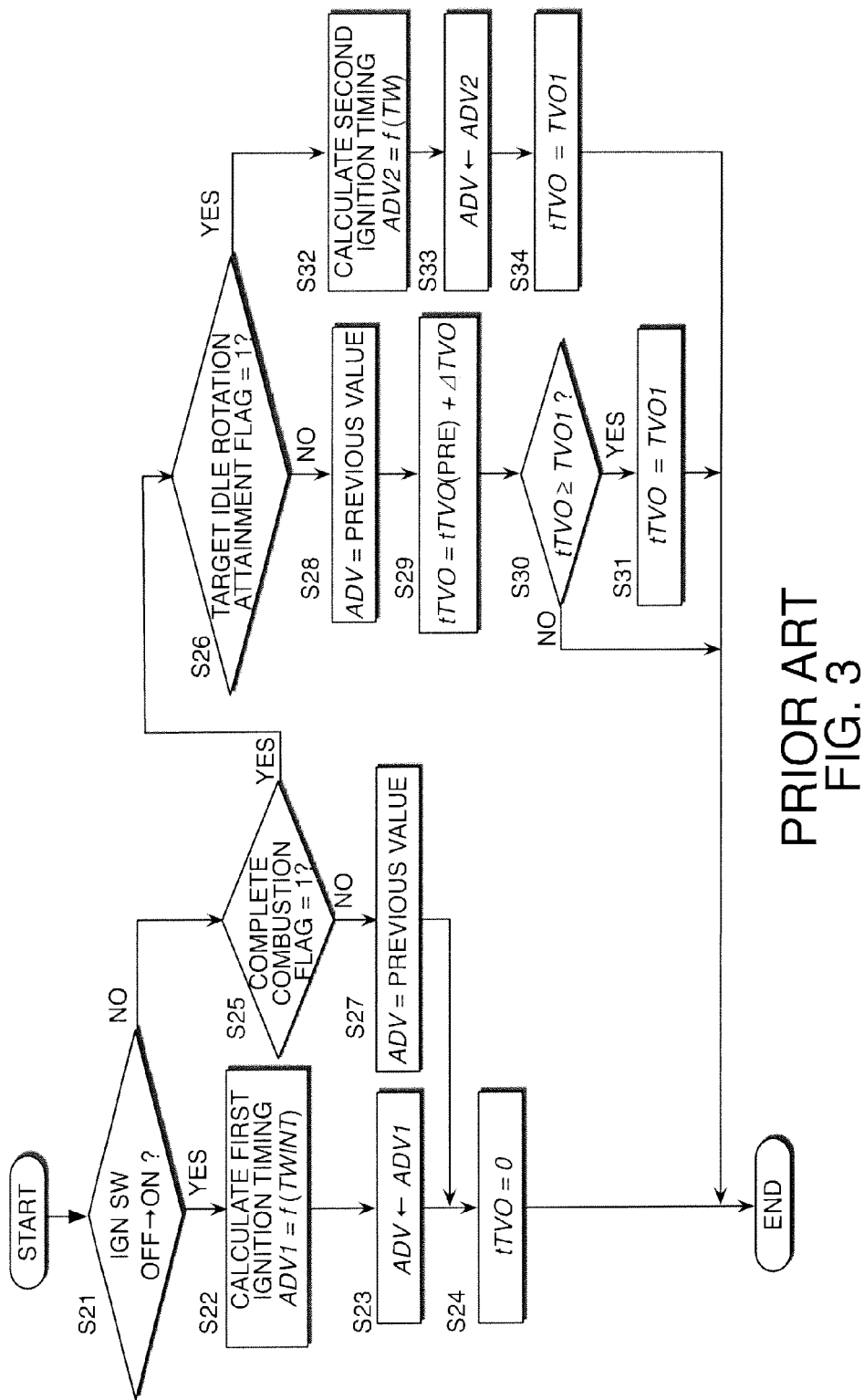
FIG. 3 is a flowchart illustrating a routine for controlling an ignition timing and a throttle opening executed by the engine controller according to the prior art.

FIG. 3 illustrates a routine for controlling the ignition timing and the throttle opening. The engine controller 31 executes this routine subsequently to the routine of FIG. 2 at certain intervals, for example, every 100 milliseconds while the ignition switch is turned on.

In a step S21, the engine controller 31 determines whether or not the current routine execution timing is immediately after the ignition switch is switched from OFF to ON.

If the determination in the step S21 is affirmative, the engine controller 31 incorporates the coolant temperature TW of the internal combustion engine 1 detected by the temperature sensor 37 as the start-up coolant temperature TWINT in a step S22. The engine controller 31 computes the first ignition timing ADV1 depending on the start-up coolant temperature TWINT. The first ignition timing ADV1 is an optimal ignition timing for the engine start-up. Here, the first ignition timing ADV1 is computed as a significantly advanced value from the ignition timing of the normal driving.

In a step S23, the engine controller 31 sets the ignition timing instruction value ADV to the value equal to the computed first ignition timing ADV1.

In a step S24, an initial value is input to a target throttle opening tTVO. The initial value is set to, for example, zero. After the processing of the step S24, the engine controller 31 terminates the routine.

Meanwhile, if the determination in the step S21 is negative, the engine controller 31 determines whether or not the complete combustion flag is unity in a step S25. If it is determined that the complete combustion flag is not unity, the engine controller 31 sets the ignition timing instruction value ADV at the previous value in a step S27. In this way, the ignition timing instruction value ADV is maintained at the first ignition timing ADV1 until it is determined that the internal combustion engine 1 has achieved complete combustion.

After the processing of the step S27, the engine controller 31 sets the target throttle opening tTVO to zero, which is the initial value, in the step S24 and terminates the routine.

In this way, until the complete combustion is performed after the cranking of the internal combustion engine 1 is initiated, the ignition timing instruction value ADV is maintained at the first ignition timing ADV1, and the target throttle opening tTVO is maintained at zero.

Meanwhile, if the complete combustion flag is unity in the determination of the step S25, the engine controller 31 determines whether or not the target idle rotation attainment flag is unity in a step S26. If it is determined that the target idle rotation attainment flag is not unity, the engine controller 31 sets the ignition timing instruction value ADV to the previous value in a step S28. Therefore, even after it is determined that the internal combustion engine 1 has achieved complete combustion, the ignition timing instruction value ADV is maintained at the value equal to the first ignition timing ADV1 until the timer value TIME reaches the predetermined value DT, that is, until the engine rotation speed Ne reaches the target idle rotation speed NEST.

After the processing of the step S28, the engine controller 31 computes the target throttle opening tTVO based on following Equation (1) in a step S29.

$$tTVO = tTVO((PRE)) + \Delta TVO, \quad (1)$$

where, ΔTVO=increment; and tTVO((PRE))=previous value of tTVO.

tTVO((PRE)) in Equation (1) denotes a previous value of the target throttle opening, whose initial value is zero.

A predetermined increment ΔTVO in Equation (1) is an increment of the target throttle opening per predetermined time. The predetermined increment ΔTVO is determined such that the target throttle opening tTVO reaches the target idle opening TVO1 when the engine rotation speed Ne reaches the target idle rotation speed NSET. Here, the target idle opening TVO1 is a throttle opening corresponding to the minimum intake air amount necessary to generate a torque capable of allowing the internal combustion engine 1 to maintain the target idle rotation speed NSET. The value of the target idle opening TVO1 is set through experiment or simulation in advance.

After the target throttle opening tTVO is set in the step S29, the engine controller 31 compares the target throttle opening tTVO and the target idle opening TVO1 in a step S30.

When the determination of the step S26 is changed to be negative for the first time, that is, immediately after the engine rotation speed Ne reaches the target idle rotation speed NEST, the target throttle opening tTVO does not exceed the target idle opening TVO1. In this case, the engine controller 31 terminates the routine without advancing the process.

In the subsequent routine execution, through the processing of the step S29, the target throttle opening tTVO increases by a predetermined increment ΔTVO whenever the routine is executed. As a result, as the target throttle opening tTVO exceeds the target idle opening TVO1, and the determination of the step S30 is changed to be affirmative, the engine controller 31 maintains the target throttle opening tTVO at TVO1 in the step S31. After the processing of the step S31, the engine controller 31 terminates the routine. Therefore, in the subsequent routine execution, even when the routine is repeatedly executed, the target throttle opening tTVO is maintained at the target idle opening TVO1 without increase.

Meanwhile, in the determination of the step S26, when the target idle rotation attainment flag has changed to unity, the engine controller 31 computes the second ignition timing ADV2 depending on the coolant temperature TW of the internal combustion engine 1 detected by the temperature sensor 37 in a step S32. The second ignition timing ADV2 may be set to, for example, the ignition timing for promoting warm-up of the first catalyst 9 in the cold start-up of the internal combustion engine 1. Alternatively, in order to suppress overshooting of the engine rotation speed by abruptly increasing the intake air amount, a delayed ignition timing may be set temporarily. In this way, the second ignition timing ADV2 is computed as a value delayed from the first ignition timing ADV1.

Then, in a step S33, the engine controller 31 sets the ignition timing instruction value ADV to the value equal to the second ignition timing ADV2.

As a result of the processing described above, when the engine rotation speed Ne reaches the target idle rotation speed NSET, the ignition timing instruction value ADV is switched from the first ignition timing ADV1 to the second ignition timing ADV2 in a stepwise manner.

In a step S34, the engine controller 31 maintains the target throttle opening tTVO equal to the previous value, that is, TVO1. After the processing of the step S34, the engine controller 31 terminates the routine.

In this way, after the engine rotation speed Ne reaches the target idle rotation speed NSET, the ignition timing instruction value ADV is switched to the second ignition timing ADV2 in a stepwise manner. Meanwhile, the target throttle opening tTVO is maintained at the target idle opening TVO1. Here, the ignition timing instruction value ADV is switched to ADV2 at one time in a stepwise manner. However, the ignition timing instruction value ADV may be switched at a predetermined change rate capable of preventing the engine rotation speed from increasing excessively.

Figure 4:
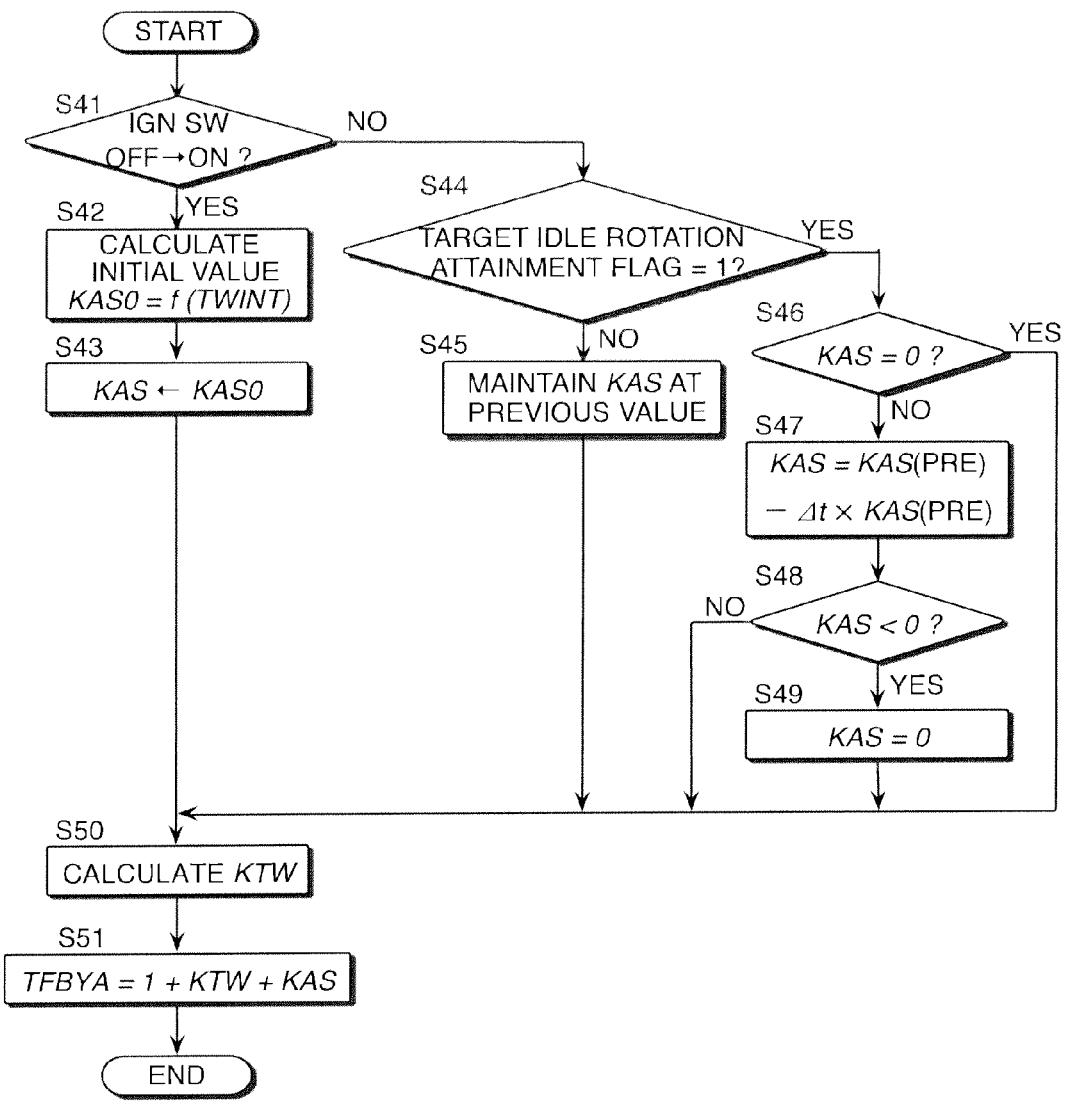
FIG. 4 is a flowchart illustrating a routine for computing a target equivalence ratio executed by the engine controller according to the prior art.

FIG. 4 illustrates a routine for computing the target equivalence ratio TFBYA executed by the engine controller 31. The equivalence ratio corresponds to an inverse of the air-fuel ratio. The engine controller 31 executes this routine at certain intervals, for example, every 100 milliseconds, while the ignition switch is turned on. In addition, the engine controller 31 is activated when the ignition switch is switched from OFF to ON. The engine controller 31 remains in the operation state while the ignition switch is turned on.

In a step S41, the engine controller 31 determines whether or not the current routine execution timing corresponds to the timing immediately after the ignition switch is switched from OFF to ON.

If the determination is affirmative, the engine controller 31 computes an initial value KAS0 of a start-up increment correction coefficient based on the start-up coolant temperature TWINT output from the temperature sensor 37 in a step S42. The initial value KAS0 of the start-up increment correction coefficient is a value that increases as the start-up coolant temperature TWINT decreases.

Then, in a step S43, the engine controller 31 sets a start-up increment correction coefficient KAS to the initial value KAS0. After the processing of the step S43, the engine controller 31 executes the processing of a step S50.

Meanwhile, if the determination is negative in the step S41, that means the ignition switch was already switched to ON in the previous routine execution. In this case, the engine controller 31 determines whether or not the target idle rotation attainment flag is at unity in a step S44. As described above, the target idle rotation attainment flag is reset to zero when the ignition switch is switched to ON, and the target idle rotation attainment flag is set to unity in the step S8 of FIG. 2. If the target idle rotation attainment flag is at unity, that means the engine rotation speed Ne has reached the target idle rotation speed NSET.

However, if the determination is negative in the step S44, the engine controller 31 sets the start-up increment correction coefficient KAS to the previous value in a step S45. In this routine, the start-up increment correction coefficient KAS is maintained at the initial value KAS0 until the determination of the step S44 becomes affirmative. After the processing of the step S45, the engine controller 31 executes the processing of the step S50.

Meanwhile, if the determination of the step S44 is affirmative, the engine controller 31 determines whether or not the start-up increment correction coefficient KAS is set at zero in a step S46. As described above, in the step S43 immediately after the start-up of the internal combustion engine 1, the start-up increment correction coefficient KAS is set to the initial value KAS0. Since the start-up increment correction coefficient KAS is set to the initial value KAS0 immediately after the engine rotation speed Ne reaches the target idle rotation speed NSET, the start-up increment correction coefficient KAS is not equal to zero.

In this case, the engine controller 31 sets the start-up increment correction coefficient KAS based on following Equation (2) in a step S47.

$$KAS = KAS(PRE) - \Delta t \times KAS(PRE), \quad (2)$$

where, $\Delta t$=predetermined decrement; and
KAS((PRE))=value of start-up increment correction coefficient KAS in the previous routine execution.

Herein, the predetermined decrement $\Delta t$ is a value for determining the decrement of the start-up increment correction coefficient KAS per predetermined time. This value is appropriately set in advance such that the start-up increment correction coefficient KAS becomes zero when the intake negative pressure is converged to a certain value. The initial value of the KAS((PRE)), indicating the previous value of the start-up increment correction coefficient, is set at KAS0.

After the target rotation attainment flag changes to unity, the engine controller 31 repeatedly performs the processing of the steps S46 and S47. As a result, the start-up increment correction coefficient KAS gradually decreases. In this regard, in a step S48, the start-up increment correction coefficient KAS is compared with zero. When the start-up increment correction coefficient KAS becomes a negative value, the process advances to a step S49, and the start-up increment correction coefficient KAS is reset to zero. After the processing of the step S49, the engine controller 31 performs the processing of the step S50.

Meanwhile, if the start-up increment correction coefficient KAS is equal to or greater than zero in the determination of the step S48, the engine controller 31 performs the processing of the step S50 without resetting the start-up increment correction coefficient KAS again.

In the step S50, the engine controller 31 computes a coolant increment correction coefficient KTW with reference to a map stored in ROM in advance based on the coolant temperature TW of the internal combustion engine 1. The coolant increment correction coefficient KTW increases as the coolant temperature TW decreases.

Then, in step S51, the engine controller 31 computes the target equivalence ratio TFBYA based on following Equation (3) using the coolant increment correction coefficient KTW and the start-up increment correction coefficient KAS.

$$TFBYA = 1 + KTW + KAS \quad (3)$$

The target equivalence ratio TFBYA is a value centered at 1.0. After completing the warm-up of the internal combustion engine 1, TFBYA=1 (where KTW=0, and KAS=0). TFBYA=1 corresponds to a fuel mixture of a stoichiometric air-fuel ratio. In the cold start-up of the internal combustion engine 1, the start-up increment correction coefficient KAS is added, so that the target equivalence ratio TFBYA becomes a value exceeding 1.0. The start-up increment correction coefficient KAS is a value obtained by considering a fuel wall flow rate in the cold start-up. Resultantly, the target equivalence ratio TFBYA becomes a value greater than 1.0. Such correction is performed to set the fuel mixture supplied to the combustion chamber 5 to the stoichiometric air-fuel ratio.

Figure 5:
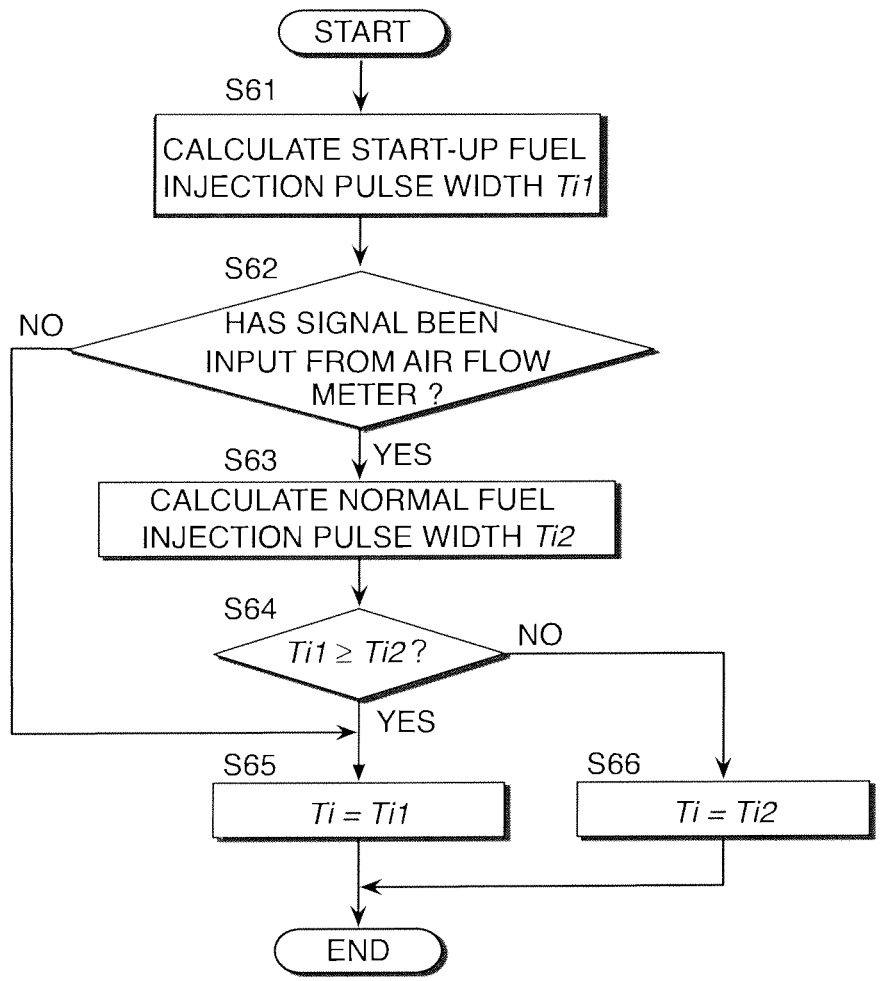
FIG. 5 is a flowchart illustrating a routine for computing a fuel injection pulse width executed by the engine controller according to the prior art.

FIG. 5 illustrates a routine for computing the fuel injection pulse width Ti executed by the engine controller 31. The engine controller 31 executes this routine at certain intervals, for example, every 100 milliseconds while the ignition switch is turned on. The routine for setting the complete combustion flag and the target idle rotation attainment flag in FIG. 2 and the routine for controlling the ignition timing and the throttle opening in FIG. 3 are sequentially executed. Meanwhile, the routine for computing the target equivalence ratio TFBYA in FIG. 4 and the routine for computing the fuel injection pulse width Ti in FIG. 5 are executed in parallel with or independently from the routines of FIGS. 2 and 3.

The fuel injection pulse width Ti is a value representative of the fuel injection amount of the fuel injector 21.

In a step S61, the engine controller 31 computes the start-up fuel injection pulse width Ti1 based on following Equation (4).

$$Ti1 = TST \times KNST \times KTST \quad (4)$$

where, TST=start-up basic injection pulse width;
KNST=rotation speed correction coefficient; and
KTST=time correction coefficient.

Methods of obtaining the start-up basic injection pulse width TST, the rotation speed correction coefficient KNST, and the time correction coefficient KTST are known in the art, and description thereof will be omitted.

In a step S62, the engine controller 31 determines whether or not there is a signal input from the air flow meter 32. If the signal from the air flow meter 32 is not input, the engine controller 31 sets the final fuel injection pulse width Ti equal to the start-up fuel injection pulse width Ti1 in a step S65. After the processing of the step S65, the engine controller 31 terminates the routine.

If there is a signal input from the air flow meter 32, the engine controller 31 computes a normal fuel injection pulse width Ti2 based on following Equation (5) using the target equivalence ratio TFBYA obtained in the most recently executed routine for computing the target equivalence ratio TFBYA of FIG. 4 in a step S63.

$$Ti2 = (Tp \times TFBYA+) \times (\alpha + \alpha m - 1) + Ts \quad (5)$$

where,
Tp=basic injection pulse width;
TFBYA=target equivalence ratio;
Kathos=transient correction amount;
$\alpha$=air-fuel ratio feedback correction coefficient;
$\alpha m$=air-fuel ratio learning correction coefficient; and
Ts=ineffectual injection pulse width The transient correction amount Kathos is a known correction amount computed basically based on an engine load, an engine rotation speed, and a temperature in a fuel adhering portion in consideration of the fuel wall flow rate of the fuel flowing along the wall surface of the intake port 4. During the start-up of the internal combustion engine 1, the fuel flowing along the wall surface of the intake port 4 out of the fuel injection amount arrives at the combustion chamber 5 with a delay. Therefore, the delay is compensated by increasing the fuel injection amount.

Concepts and computation methods for the air-fuel ratio feedback correction coefficient $\alpha$, the air-fuel ratio learning correction coefficient $\alpha m$, and the ineffectual injection pulse width Ts are known in the art.

The basic injection pulse width Tp is computed based on following Equation (6).

$$Tp = K \times Qa/Ne, \quad (6)$$

where, Qa=intake air amount detected by the air flow meter 32.

The constant K in Equation (6) is set such that the air-fuel ratio of the fuel mixture becomes the stoichiometric air-fuel ratio. While the start-up increment correction coefficient KAS is a positive value greater than zero, the fuel injection amount from the fuel injector 21, that is, the fuel injection pulse width Ti is compensated in an increasing manner.

In step S64 to S66, the engine controller 31 compares the start-up fuel injection pulse width Ti1 and the normal fuel injection pulse width Ti2, and the greater one is selected for the final fuel injection pulse width Ti. Then, the engine controller 31 terminates the routine.

The fuel injection pulse width Ti is transmitted to an output register, and the fuel injectors 21 in each cylinder inject fuel into the intake port 4 for a period corresponding to the fuel injection pulse width Ti at a predetermined fuel injection timing.

The control of the ignition timing, the throttle opening, and the fuel injection amount during the start-up of the internal combustion engine 1 is disclosed in JP2007-278073A, published by Japan Patent Office in Oct. 25, 2007, the entire content of which is incorporated herein by reference.

Next, description will be made for control of the throttle applied during the start-up of the internal combustion engine 1 according to this invention.

Figure 6A:
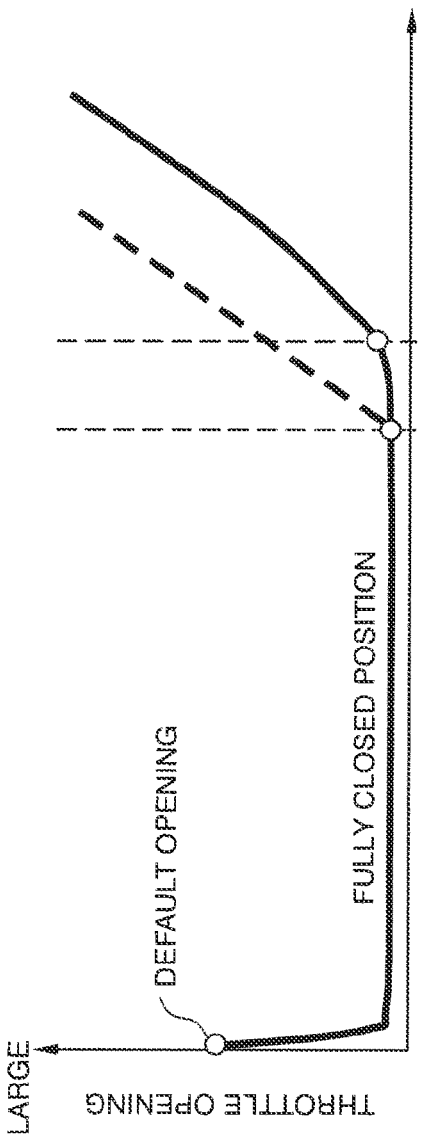
FIGS. 6A and 6B are timing charts for describing a concept of this invention in comparison with the prior art.
Figure 6B:
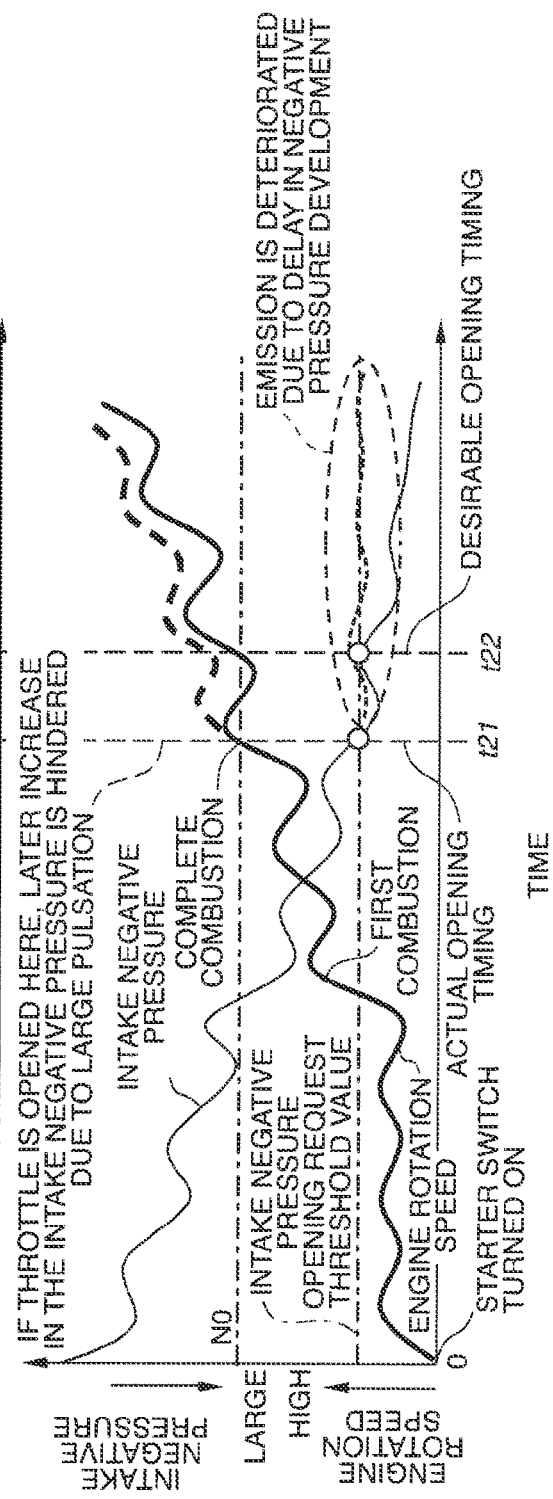

Referring to FIGS. 6A and 6B, while the internal combustion engine 1 stops, the throttle 23 has a default opening, and the intake negative pressure is equal to the atmospheric pressure. When the starter switch 36 is turned on, that is, when cranking is initiated, the throttle 23 is driven by the throttle motor 24 to a fully closed position. Herein, the fully closed position is a generic term. In practice, a predetermined gap is set between the throttle 23 and the wall surface of the intake pipe around the throttle 23 in order to prevent a damage caused by interference between a valve body and a passage. For this reason, even when the throttle 23 is in a fully closed position, an air passing through this gap is aspirated into the combustion chamber 5.

By virtue of a pumping effect of the internal combustion engine 1 caused by cranking, the air is aspirated into the combustion chamber 5 of each cylinder, so that the intake negative pressure decreases from the atmospheric pressure with pulsation. The timing for opening the throttle 23 follows a timing at which the actual intake negative pressure can sufficiently promote vaporization of fuel. This timing is a timing at which the intake air amount necessary to maintain the engine rotation speed at the target idle rotation speed can be supplied to the combustion chamber when the ignition timing is delayed in a stepwise manner from the advancing-side start-up ignition timing or is delayed at a predetermined variation speed, at least, capable of preventing the engine rotation speed from increasing excessively, after the engine rotation speed reaches the target idle rotation speed. If this timing is too late, it is difficult to obtain the air amount necessary to maintain the target idle rotation speed. On the contrary, if this timing is too fast, the intake negative pressure becomes insufficient, and the vaporization promoting effect is degraded or lost. Therefore, it is desirable to set this timing appropriately. In the prior art, this timing is set, to a timing at which the intake negative pressure reaches a predetermined value, and the predetermined value is indicated by an intake negative pressure opening request threshold value in FIG. 6B. The intake negative pressure opening request threshold value is defined appropriately in advance. In the prior art described above, it is assumed that the intake negative pressure opening request threshold value is reached as the complete combustion flag changes to unity in the step S25, and the target throttle opening tTVO is incremented in the step S29 whenever the subsequent routine is executed.

Therefore, in the prior art described above, the throttle 23 starts to be opened as indicated by the dashed line in FIG. 6A at a time t21 at which the intake negative pressure initially reaches the intake negative pressure opening request threshold value as illustrated in FIG. 6B.

However, the actual intake negative pressure decreases toward the atmospheric pressure immediately after time t21 due to the pulsation. Herein, the decrease in the intake negative pressure means pressure increase toward the atmospheric pressure. As the throttle 23 is opened at time t21, the later increase in the intake negative pressure is hindered, so that the intake negative pressure fluctuates near the intake negative pressure opening request threshold value as indicated by the dashed line of FIG. 6B. If the intake negative pressure does not increase over the intake negative pressure opening request threshold value, vaporization of fuel is not sufficiently promoted, and it is difficult to suppress the increase of hydrocarbons (HC) generated in a large amount during the cold start-up.

In the engine control apparatus according to this invention, the throttle 23 starts to be opened when the actual intake negative pressure can be smoothly developed later, and the intake air amount necessary to maintain the engine rotation speed in the target idle rotation speed can be supplied, that is, at time t22 at which the actual intake negative pressure secondly reaches the intake negative pressure opening request threshold value after the cranking starts. In this way, for example, in the example of FIG. 6B, as the throttle 23 starts to be opened from time t22 at which the intake negative pressure opening request threshold value is secondly reached after the cranking initiation, the actual intake negative pressure smoothly increases as indicated by the solid line of FIG. 6B, so that it is possible to prevent the problem that it is difficult to obtain the intake air amount necessary to maintain the target idle rotation speed later.

Next, description will be made for a method of determining time t22 corresponding to the timing for starting to open the throttle 23 in the fully closed position.

The engine control apparatus according to this invention counts a number of revolutions or a number of strokes of the engine from cranking initiation. In addition, it is determined whether or not the timing for starting to open the throttle 23 in a fully closed position is reached based on whether or not a count number has reached a predetermined number corresponding to the timing at which the actual intake negative pressure is smoothly developed, and the intake air amount necessary to maintain the target idle rotation speed is obtained, that is, the timing at which the intake negative pressure opening request threshold value is secondly reached.

Referring to FIGS. 7A and 7B, here, time t22 corresponding to the timing at which the actual intake negative pressure is smoothly developed, and the intake air amount necessary to hold the target idle rotation speed is obtained, that is, the timing at which the actual intake negative pressure secondly reaches the intake negative pressure opening request threshold value is determined based on the number of strokes from cranking initiation. The number of strokes corresponds to a crank angle of 180° in 4-cylinder and 8-cylinder engines and corresponds to a crank angle of 120° in 6-cylinder engines. That is, in 4-cylinder and 8-cylinder engines, a half of the number of strokes corresponds to the number of revolutions of the engine. In 6-cylinder engines, at die crank angle of 120°, one third of the number of strokes corresponds to the number of revolutions of the engine. Since the number of strokes and the number of revolutions make a permanent relationship, the number of revolutions and the number of strokes of the engine may be equivalently substituted with each other.

These figures are according to an embodiment this invention and the abscissa denotes the number of strokes because the stroke is synchronized with fluctuation of the intake negative pressure, which is convenient for description purposes. The numbered stroke positions correspond to peaks of the fluctuation of the intake negative pressure. The stroke interval corresponds to a half revolution in 4-cylinder and 8-cylinder engines and corresponds one-third revolution in 6-cylinder engines.

The engine controller 31 counts the number of strokes from cranking initiation and opens the throttle 23 when the number of strokes reaches a predetermined number six. As the predetermined number, the number of strokes corresponding to the timing at which the actual intake negative pressure is smoothly developed, and the intake air amount necessary to maintain the target idle rotation speed is obtained, that is, the timing at which the intake negative pressure secondly reaches the intake negative pressure opening request threshold value is obtained in advance through experiment or simulation. The predetermined number six is an exemplary predetermined number obtained by assuming 4-cylinder or 8-cylinder engines. However, the predetermined number is not limited to six.

Referring to FIGS. 8A to 8D, according to this embodiment, the engine controller 31 uses an intake negative pressure development start-up permission flag, a throttling flag, and a throttle control flag.

The intake negative pressure development start-up permission flag of FIG. 8A is a flag reset to zero when the throttle control according to this invention is not necessary for any reason. Normally, at a time t0 at which the ignition key switch is turned on, or when the starter switch 36 is turned on, the intake negative pressure development start-up permission flag is initially set to unity. The fact that the intake negative pressure development start-up permission flag is set to unity means that the throttle control according to this invention is permitted.

The throttling flag of FIG. 8C is a flag for setting the throttle 23 in a fully closed position immediately after cranking initiation. The throttling flag is initially set to unity at the same time when the intake negative pressure development start-up permission flag is initially set to unity.

The throttle control flag of FIG. 8D is a flag for opening the throttle 23. The engine controller 31 counts the number of strokes after the cranking initiation. The engine controller 31 switches the throttling flag from unity to zero and switches the throttle control flag from zero, which is an initial value, to unity at time t22 at which the count number of strokes reaches a predetermined number six. The number of strokes corresponds to the number of peaks in the output fluctuation of the crank angle sensor. The engine controller 31 obtains the number of strokes by counting the number of peaks in the output fluctuation from the output signal of the crank angle sensor.

In addition, the engine controller 31 switches the intake negative pressure development start-up permission flag and the throttle control flag from unity to zero respectively at time t2 at which the engine rotation speed reaches the target idle rotation speed, that is, when the throttle opening reaches a predetermined opening TVO1 in FIG. 8B.

Next, referring to FIGS. 9 to 11, description will be made for a throttle control routine executed by the engine controller 31 using the flags described above. The engine controller 31 executes the routines of FIGS. 2, 4, and 5 of the prior art in parallel while the ignition switch is turned on. In addition, subsequently to execution of the routine of FIG. 2, the ignition timing control routine of FIG. 9, the flag setting routine of FIG. 10, and the throttle control routine of FIG. 11 are executed instead of the routine of FIG. 3.

Figure 9:
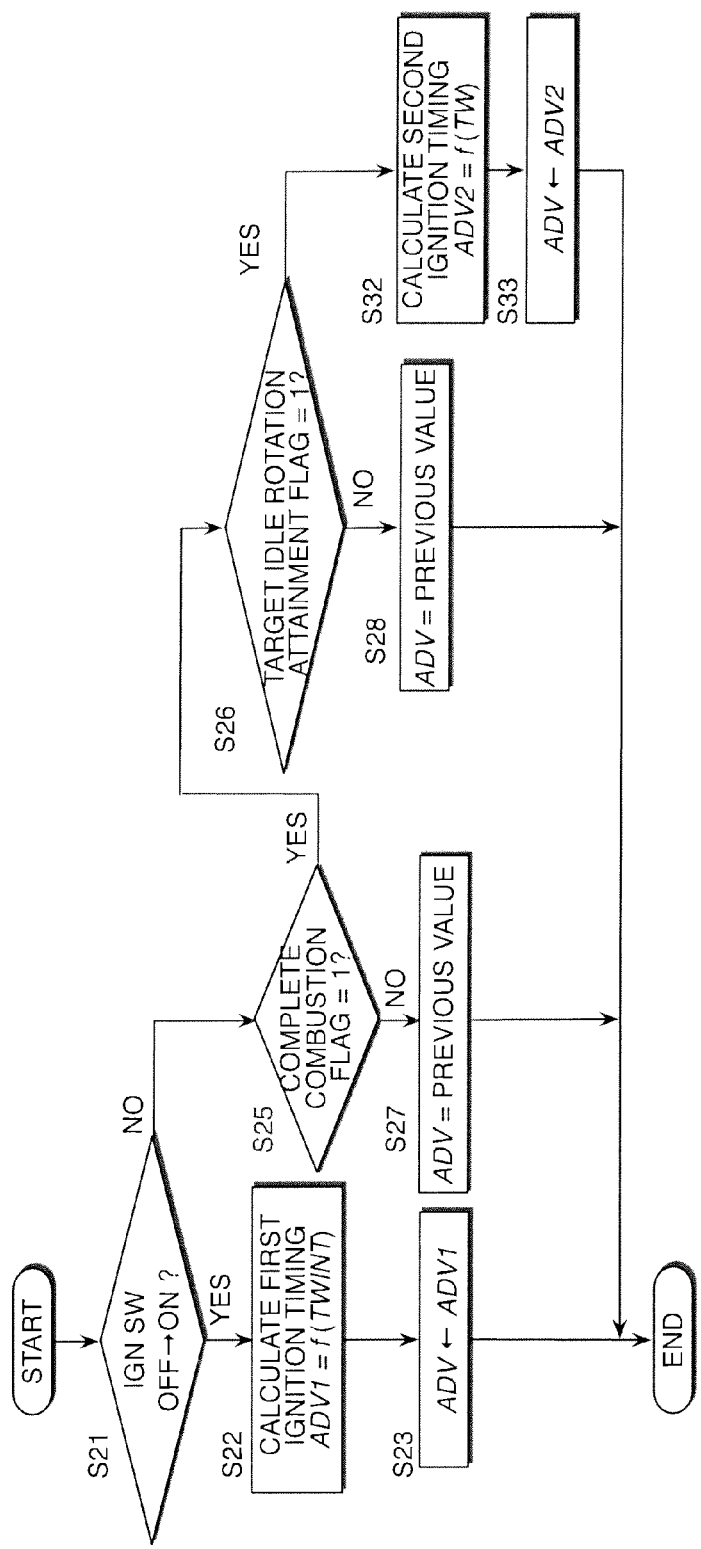
FIG. 9 is a flowchart illustrating a routine for controlling an ignition executed by an engine controller according to this invention.

The routine for computing the ignition timing instruction value of FIG. 9 is obtained by deleting steps S24, S30, S31, and S34 relating to the throttle control from the routine of FIG. 3 according to the prior art. The engine controller 31 controls only the ignition timing of the spark plug 14 in this routine and controls the throttle 23 in the routines of FIGS. 11 and 12. In addition, while the ignition timing is switched in a stepwise manner in the routine of FIG. 9, the engine rotation speed may be delayed at a variation rate sufficient to prevent an excessive increase in the engine rotation speed instead of the stepwise switching.

Figure 10:
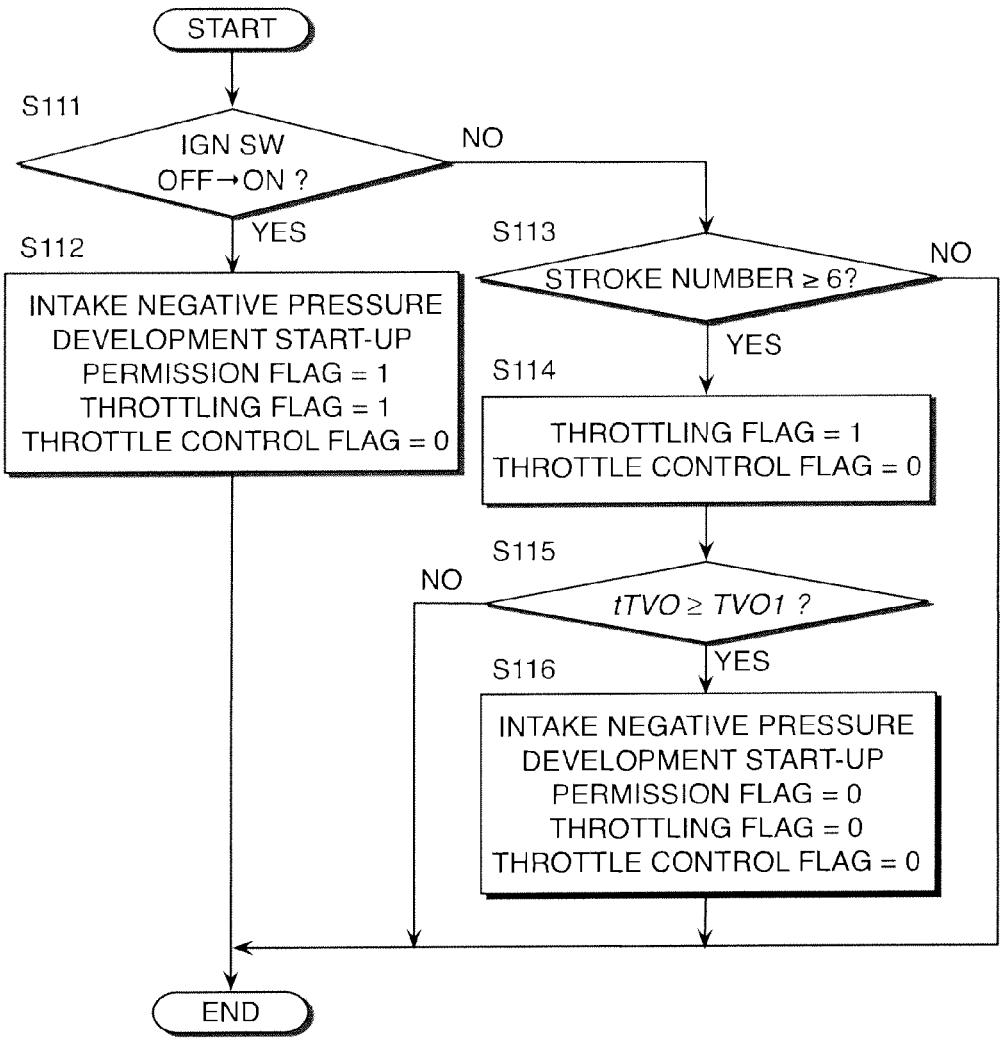
FIG. 10 is a flowchart illustrating a routine for setting flags executed by the engine controller according to this invention.
Figure 11:
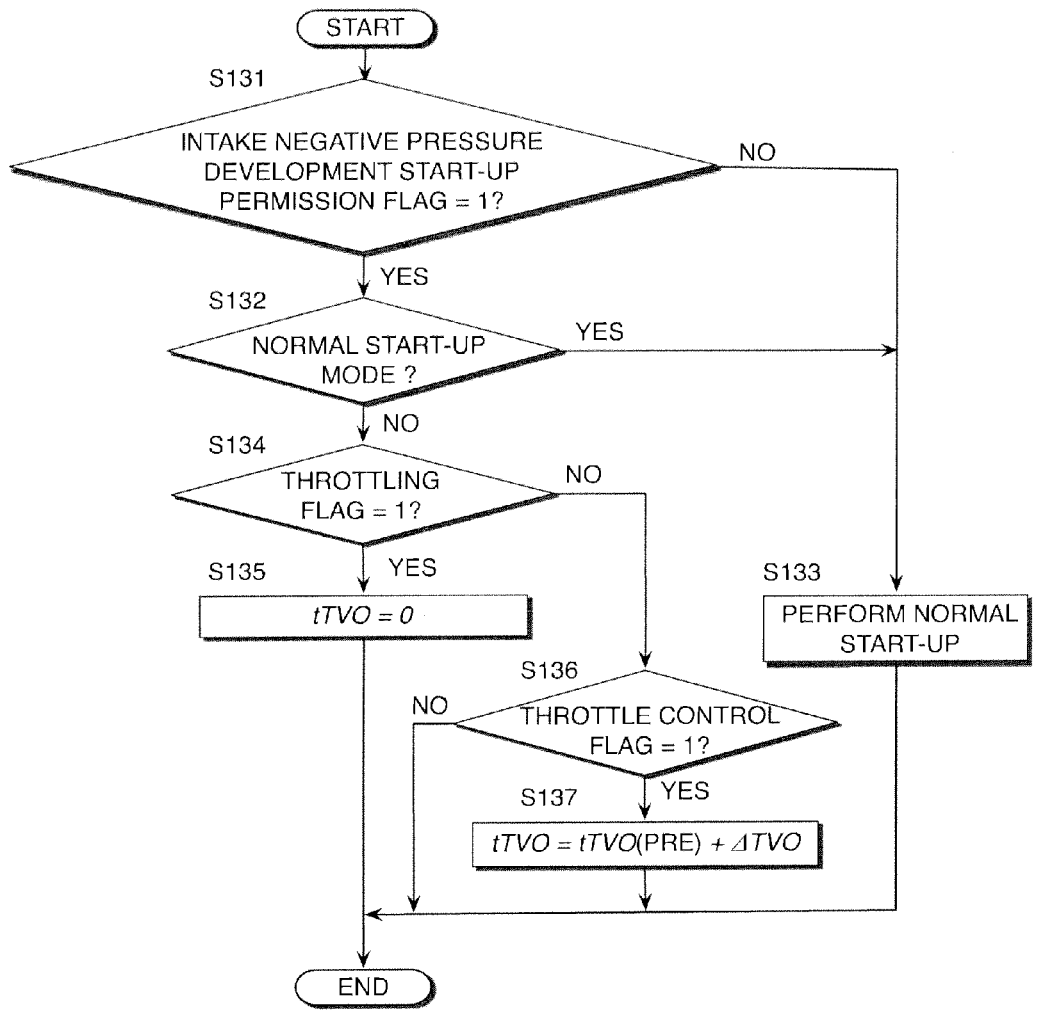
FIG. 11 is a flowchart illustrating a routine for controlling a throttle opening executed by the engine controller according to this invention.

The flag setting routine of FIG. 10 is executed subsequently to the ignition timing computation routine of FIG. 9.

Referring to FIG. 10 first, in a step S111, the engine controller 31 determines whether or not the current routine execution timing is immediately after the ignition switch is switched from OFF to ON. If the determination is affirmative, the engine controller 31 sets the intake negative pressure development start-up permission flag, the throttling flag, and the throttle control flag to unity, unity, and zero, respectively in a step S112, and then, terminates the routine. This processing corresponds to the processing at time t0 in FIGS. 8A to 8D.

If the determination is negative in the step S111, the engine controller 31 determines whether or not the number of strokes is equal to or greater than a predetermined number six from the cranking initiation in a step S113.

If the number of strokes is smaller than the predetermined number six, the engine controller 31 terminates the routine without executing further steps. If the number of strokes is equal to or greater than the predetermined number six, the engine controller 31 sets the throttling flag and the throttle control flag to zero and unity, respectively, in a step S114. This processing corresponds to the processing at time t22 in FIGS. 8A to 8D.

Then, in a step S115, the engine controller 31 determines whether or not the target throttle opening tTVO has reached the target idle opening TVO1.

If the determination is negative, the engine controller 31 terminates the routine immediately.

If the determination is affirmative, the engine controller 31 switches both the intake negative pressure development start-up permission flag and the throttle control flag to zero and maintains the throttling flag at zero in a step S116. This processing corresponds to the processing at time t2 of FIGS. 8A to 8D. After the processing of the step S116, the engine controller 31 terminates the routine.

The throttle control routine of FIG. 11 is executed subsequently to the flag setting routine of FIG. 10.

Referring to FIG. 11, in a step S131, the engine controller 31 determines whether or not the intake negative pressure development start-up permission flag is at unity. If the intake negative pressure development start-up permission flag is at unity, the engine controller 31 determines whether or not the mode is set to a normal start-up mode in a step S132.

The normal start-up mode means that the internal combustion engine 1 performs start-up in a high-temperature state. The normal start-up mode is executed when a driver performs a start-up operation immediately after driving of the internal combustion engine 1 stops or when the start-up of the internal combustion engine 1 is performed in a warm-up state caused by remaining heat in the previous driving, such as restarting from an idle stop state. In this case, the development of the intake negative pressure is not necessary. Since this embodiment focuses on a cold start-up of the internal combustion engine 1 necessitating development of the intake negative pressure, the control according to this invention is not performed in the normal start-up mode, and the normal start-up is performed in a step S133.

In addition, the engine controller 31 performs the normal control in the step S133 when the intake negative pressure development start-up permission flag is not at unity in the step S131. The normal control means the start-up control applied to a case where the internal combustion engine 1 does not necessitate warm-up. After the processing of the step S133, the engine controller 31 terminates the routine.

When a cold start-up of the internal combustion engine 1 is performed, the determination of the step S132 is negative.

In this case, the engine controller 31 determines whether or not the throttling flag is at unity in step S134. If the throttling flag is at unity, the engine controller 31 sets the target throttle opening tTVO to zero in a step S135. That is, the engine controller 31 controls the throttle 23 in a fully closed position. After the processing of the step S135, the engine controller 31 terminates the routine.

Meanwhile, if the throttling flag is not at unity, the engine controller 31 determines the throttle control flag in a step S136. If the throttle control flag is not at unity, the engine controller 31 immediately terminates the routine. If the throttle control flag is at unity, the target throttle opening tTVO is computed based on Equation (1) described above in a step S137. After the processing of the step S137, the engine controller 31 terminates the routine.

By executing the flag setting routine of FIG. 10 and the throttle control routine of FIG. 11, it is possible to determine, with high accuracy, the time t22 corresponding to the timing at which the actual intake negative pressure is smoothly developed, and the intake air amount necessary to hold the target idle rotation speed is obtained, that is, the timing at which the actual intake negative pressure secondly reaches the intake negative pressure opening request threshold value as indicated by the solid line of FIGS. 8A to 8D, and start to open the throttle 23. As a result, the actual intake negative pressure smoothly decreases after the time t22.

Therefore, it is possible to obtain both the intake negative pressure lower than the atmospheric pressure for promoting vaporization and the intake air amount suitable for complete combustion of the internal combustion engine 1. In addition, it is possible to improve robustness of the intake negative pressure control during the start-up.

In the start-up of the internal combustion engine 1, the engine rotation speed is significantly fluctuated as illustrated in FIG. 7B. According to this embodiment, the number of strokes is counted from cranking initiation based on the output change of the crank angle sensor, and the timing for starting to open the throttle 23 is determined based the count number. In this control, the output of the crank angle sensor is not used to obtain the engine rotation speed in itself, but is used to detect peaks of the engine rotation speed in the fluctuation of the internal combustion engine. Therefore, the timing for starting to open the throttle 23 can be determined with high precision in comparison with a case where the timing for starting to open the throttle 23 is determined based on the engine rotation speed in itself.

In the embodiment described above, the number of strokes is counted based on the output change of the crank angle sensor. However, it is possible to count the number of strokes or the number of revolutions of the engine using other sensors. Next, description will be made for a case where the intake air pressure of the internal combustion engine 1 is detected using a pressure sensor 38.

Japanese Patent No. 3,586,975, published by Japanese Patent Office in Nov. 10, 2004, discloses control in which the intake negative pressure is detected using a pressure sensor, and the throttle is opened when the measured intake negative pressure reaches a predetermined pressure. However, in the cranking, both the actual intake negative pressure and the detected intake negative pressure are significantly changed. Therefore, if the timing for starting to open the throttle is determined based on the intake negative pressure value detected by the pressure sensor, a problem may occur in accuracy.

Meanwhile, the intake negative pressure in the cranking is significantly fluctuated. The engine controller 31 counts the number of strokes or the number of revolutions from the cranking initiation of the internal combustion engine 1 by counting peaks in the intake negative pressure from the output change of the pressure sensor 38 instead of based on the value of the intake negative pressure, in itself, detected by the pressure sensor 38 provided in the intake collector 2. If the timing for starting to open the throttle 23 is determined based on the count obtained in this way, it is possible to determine the timing for starting to open the throttle 23 with high accuracy.

That is, it is possible to determine the timing for starting to open the throttle 23 with high accuracy also by counting the number of strokes or the number of revolutions of the engine based on the output change of the pressure sensor 38.

The contents of Tokugan 2010-290138, with a filing date of Dec. 27, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, according to this invention, it is possible to improve cold start-up performance of the internal combustion engine. A preferable effect is therefore expected when the invention is applied to vehicle engines used in various start-up environments.

The embodiments of this invention in which an exclusive property or privilege is claimed are defined as follows:

The invention claimed is:
1. A method of controlling start-up of an internal combustion engine that has a throttle for controlling an intake air amount and a crank angle sensor that detects a rotation speed of the internal combustion engine, and performs a start-up through cranking, the method comprising:
   detecting cranking initiation of the internal combustion engine;
   closing the throttle when the cranking is initiated;
   counting a number of strokes from the cranking initiation or a number of revolutions from the cranking initiation of the internal combustion engine based on a fluctuation of an output signal of the crank angle sensor;
   determining whether or not a count number has reached a predetermined number; and
   opening the throttle when the count number has reached the predetermined number,
   wherein the predetermined number is set in advance such that thereafter an intake negative pressure is developed and an intake air amount required to maintain a target idle rotation speed is obtained.
2. The method as defined in claim 1, further comprising stopping opening of the throttle when a throttle opening corresponding to the target idle rotation speed has been achieved.
3. The method as defined in claim 1, further comprising determining whether or not a rotation speed of the internal combustion engine has reached a target idle rotation speed and delaying an ignition timing when the rotation speed of the internal combustion engine has reached the target idle rotation speed.

4. An apparatus for controlling start-up of an internal combustion engine that has a throttle for controlling an intake air amount and performs the start-up through cranking, the apparatus comprising:
 a sensor that detects cranking initiation of the internal combustion engine;
 a crank angle sensor that detects a rotation speed of the internal combustion engine; and
 a programmable controller programmed to:
  close the throttle when the cranking is initiated,
  count a number of strokes from the cranking initiation or a number of revolutions from the cranking initiation of the internal combustion engine based on a fluctuation of an output signal of the crank angle sensor,
  determine whether or not a count number has reached a predetermined number, and
  open the throttle when the count number has reached the predetermined number,
  wherein the predetermined number is set in advance such that thereafter an intake negative pressure is developed and an intake air amount required to maintain a target idle rotation speed is obtained.

5. The apparatus as defined in claim 4, further comprising a pressure sensor that detects the intake negative pressure of the internal combustion engine, wherein the controller is further programmed to count the number of strokes or the number of revolutions based on a fluctuation of an output signal of the pressure sensor.

6. The method as defined in claim 1, wherein the predetermined number corresponds to a timing later than a timing when the internal combustion engine achieves a complete combustion.

7. The apparatus as defined in claim 4, wherein the predetermined number corresponds to a timing later than a timing when the internal combustion engine achieves a complete combustion.

* * * * *